R. J. LACEY & E. GAUGHRAN.
PICTURE MACHINE APPLIANCE.
APPLICATION FILED MAY 15, 1914.
1,127,647. Patented Feb. 9, 1915.
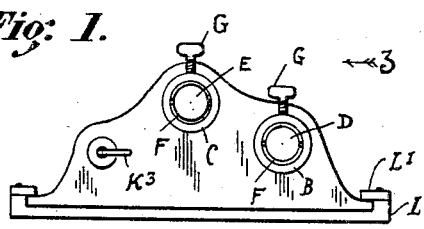
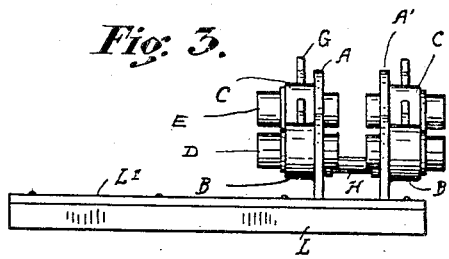
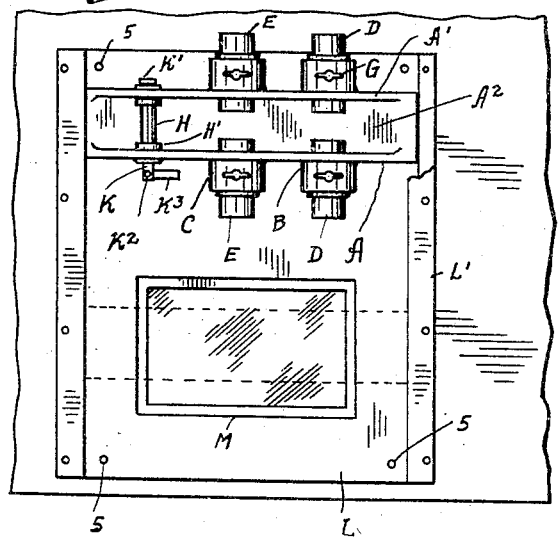
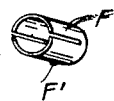
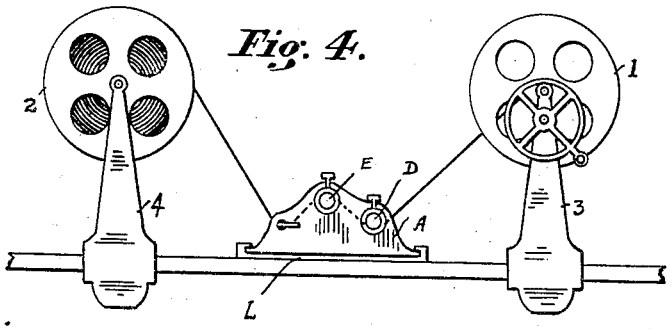
WITNESSES:
INVENTORS
RAYMOND J. LACEY,
EDWARD GAUGHRAN.
BY
ATTORNEY.

UNITED STATES PATENT OFFICE.

RAYMOND J. LACEY AND EDWARD GAUGHRAN, OF MUNCIE, INDIANA.

PICTURE-MACHINE APPLIANCE.

1,127,647.  Specification of Letters Patent.  Patented Feb. 9, 1915.

Application filed May 15, 1914. Serial No. 838,848.

*To all whom it may concern:*

Be it known that we, RAYMOND J. LACEY and EDWARD GAUGHRAN, citizens of the United States, residing at Muncie, in the county of Delaware and State of Indiana, have invented certain new and useful Improvements in Picture-Machine Appliances, of which the following is a specification.

This invention relates to improvements in picture machine appliances, and has for its object to provide a device to be used in connection with a moving picture machine whereby the work of handling the film may be facilitated and the wear and tear on the film in its being passed from and to its reel, may be minimized.

In the operating of the moving picture machine, the film is passed from the reel and across the face of the machine lens, and is carried thence onto a suitable receiving reel. The machine is equipped with yieldable guide or retaining bars at the sides of the path of the film that are engaged by the edges of the film and serve to maintain the latter in true alinement as it passes the face of the lens. Other engaging surfaces are so arranged that while there is free travel of the film, yet it is retained against transverse displacement and at the same time is prevented from puckering or warping. In the practice of operating these film machines it is found that in the passing over these holding or retaining surfaces, of the film, there occurs a gritty deposit or precipitation at the faces of the metal guides. This gritty or carbon like deposit adheres to the metallic faces of the said guides with such tenacity that cutting or abrasion of the film occurs, and accordingly the edges of the film become mutilated and weakened, and with the consequent impairment of the film, fracture and tearing of same finally results. The necessity of winding and re-winding these films being frequent, the abrasion and injury to same as above indicated, unless prevented, comparatively soon renders the edges of the film very weak and fragile, and renders the operation of same so uncertain that interruption in its travel occurs.

The objects of this invention are to provide a device to facilitate the business of passing the film from one reel to the other, and to lubricate both sides of each edge of the film in such manner and with such effect that friction at the bearing or guiding surfaces in the machine, is minimized, and the tendency of precipitation or adhesion at said surfaces of foreign particles, is overcome. These objects, and other purposes which will be apparent as the nature of our invention is better understood, are accomplished by and the invention is embodied in the new construction, combination and arrangement of parts illustrated in the accompanying drawings, described in this specification, and defined in the appended claims.

Similar characters of reference are applied to the several parts of the invention as the same appear in the different views in the drawings, in which—

Figure 1 is a side view of the invention. Fig. 2 is a top plan view of Fig. 1. Fig. 3 is an end view, taken in the direction indicated by the arrow 3 in Fig. 1. Fig. 4 is a view showing the invention in position in readiness for operation. Fig. 5 is a detailed view of one of the clutch rings.

The frame consists of side plates A and A¹ that rise from a bottom plate A². These side plates are provided with pairs of bosses B and C positioned relatively to each other as shown, and which constitute housings in which are disposed the pairs of lubricator studs D and E. The studs are cylindrical and are of a non-friction composition containing lubricant of proper nature capable of being taken up by the perforated edge of the film moving in contact with same. These stubs are directly retained in clutch rings F disposed in the bores of the said bosses. Each of these clutch rings consists of a resilient cylindrical shell divided longitudinally as shown in Fig. 5. On the external face of this clutch ring is a tooth F¹ which fits into a recess therefor (not shown) in the bore of the boss. To tighten this clutch ring against its stub and thereby to hold the latter securely at adjusted position, the set screw G is screwed down on the clutch ring.

H designates a guide roller. This guide roller has flanges H¹ spaced apart a suitable distance to constitute bearings over which the edges of the film may travel. The pin K which constitutes a journal for the guide roller, rests in holes provided therefor in the wall plates A and A¹. The rear end of the said pin K is provided with a head K¹. The forward end of the pin has an elbow joint K² sufficiently stiff that the arm K³ turned to its position as shown in Fig. 2, retains the pin against displacement. When it is necessary or desired to remove this pin, the arm K³ is turned to straight or longitudinal position, the pin may be then simply slipped free from its bearings, and the guide roller H is released. The frame just described is supported on a base plate L of the general form and proportion shown; the bottom plate A² has its ends loosely retained by guide bars L¹, and the said frame is capable of being shifted on said base plate.

At Fig. 4 is shown the usual arrangement of the reels as placed on the operator's bench. These reels are supported on suitable standards 3 and 4 at the usual distance apart. In the said bench, at proper location between the reels is provided an opening which is bridged by a panel of glass. A lamp (not shown) positioned underneath this glass affords light from below so that the operator may have the proper view of the film when examination or repair of thereof may be necessary. In the base plate L we provide an opening M of proper dimensions to register with the said glass.

The mode of practising our invention may be readily understood. The device in readiness for use appears as shown in Fig. 2. The base plate is secured by screws 5 to the operator's bench, with its opening at registration with the glass bridge. The frame is slipped from the shifted or translated location shown, to location in alinement with the reels; in this instance.—the dotted line position. The end of the film is then passed underneath guide-roller H thence above the stubs E, thence below stubs D, and then to reel 1. By the usual rotation then, of reel 1 in the business of winding the film, the operation of the invention is such that as the said reel is actuated, the film, its edges bearing lightly on the polished flanges of the guide roller H, passes slidingly in bearing contact with the ends of the stubs E, and in similar bearing contact with the ends of the stubs D, both sides of each edge of the film being treated to the lubricant carried by the stub ends. The edges of the film being perforated there is a gathering or picking up by the edges of these perforations of a sufficient quantity of the lubricant to afford lubrication for the edges of the said perforations in their passing over the sprocket teeth of the wheels in the machine. At the same time there is a lubrication of the body portion of the film at these edges so that in the passing of same over the holding or guide members heretofore described as part of the machine, there is a minimum of friction; and moreover, the lubricant is imparted to the faces of said guides and tendency of foreign particles to accumulate or adhere to the faces of the guides is overcome.

Where it may become necessary to have access to the film for examination or repair, the guide roller H is taken from its bearings. The film may be then easily taken from between the frame plates; the frame is then shifted to the position shown in Fig. 2, which leaves free the space above the glass panel where the work or examination and repairing is done. In their proper position the stubs are set so that the extent of same inwardly is sufficient to afford contact of the edges only, of the film. By virtue of this arrangement and of that of the guide roller, the face portion of the film has no contact with any part of the machine, at the same time there is such correct guiding of the film that the winding thereof from one reel to the other, at high speed, is not interfered with.

The efficiency of this invention is especially apparent in the case of "first run" or brand new films. The passing of a new film through the picture machine, the first time, besides being noisy, is accompanied by such a clogging and fouling at the guide bars, and the friction is so highly abnormal, that abrasion and weakening of the edges of the film invariably follows. Actual mutilation and fracture of the film may be prevented only by stopping the operation of the machine and scraping and cleaning the guide members. In some instances the fouling of these guide or keeping members has been so severe that same have had to be entirely removed and repolished.

In the practice of our invention the stubs E and D do not need to be re-set or placed after they have been once adjusted to the proper position to properly accommodate the edges of the film. The effect on the ends of the stubs, by the repeated passing thereof of the film, is gradually to wear away or sever the end of the stub. When this has occurred, the stubs are simply again moved inwardly and re-set at the proper adjusted position.

What we claim as our invention, and desire to secure by Letters Patent of the United States, is:—

1. A film lubricating device comprising a frame having supports oppositely disposed, lubricating stubs carried by said supports and having their ends projected inwardly, and a roller element arranged between the supports and over which the film is passed in its travel over one pair of stubs and under the other pair of stubs.

2. A film lubricating device comprising a frame having supports, pairs of stubs carried by said supports and which have their ends projected inwardly, a roller arranged between the supports over which to pass the film in its travel over one pair of stubs and under the other pair of stubs.

In testimony whereof we affix our signatures in presence of two witnesses.

RAYMOND J. LACEY.
EDWARD GAUGHRAN.

Witnesses:
 DAVID A. McLAIN,
 THOMAS L. RYAN.